United States Patent [19]

Hamada et al.

[11] Patent Number: 5,409,750
[45] Date of Patent: Apr. 25, 1995

[54] STRETCHED MOLDED STRUCTURE AND A PROCESS FOR ITS PRODUCTION

[75] Inventors: Yorihisa Hamada; Yoshitsugu Maruhashi, both of Yokohama, Japan

[73] Assignee: Toyo Seikan Kaisha, Ltd., Tokyo, Japan

[21] Appl. No.: 161,267

[22] Filed: Dec. 3, 1993

[30] Foreign Application Priority Data

Dec. 8, 1992 [JP] Japan .................. 4-328078

[51] Int. Cl.$^6$ .................................. G65D 1/00
[52] U.S. Cl. .................. 428/35.7; 428/36.92; 428/910; 215/1 C; 215/31
[58] Field of Search ............ 428/36.92, 35.7, 480, 428/910; 215/1 C, 31

[56] References Cited

U.S. PATENT DOCUMENTS 4,286,011 8/1981 Wong .................................. 428/220
4,515,858 5/1985 Bayan .................................. 428/364

FOREIGN PATENT DOCUMENTS 0300836 1/1988 European Pat. Off. .

OTHER PUBLICATIONS

Database WPI, Week 7824, Derwent Publications. Ltd., AN 78-43141A.
Database WPI, Week 7912, Derwent Publications. Ltd., AN 79-22621B.
Database WPI, Week 9305, Derwent Publications. Ltd., AN 93-039347.
Database WPI, Week 7436, Derwent Publications, Ltd., AN 74-63741V.
Patent Abstracts of Japan, vol. 14, No. 6 (M916), 9 Jan. 1989, JP-A-01 254 539.

Primary Examiner—Charles R. Nold
Attorney, Agent, or Firm—Sughrue, Mion, Zinn, Macpeak & Seas

[57] ABSTRACT

The present invention relates to a stretch molded structure obtained by stretch molding a polyester composition containing a thermoplastic polyester (A) comprising an ethylene terephthalate unit as a main component and a thermoplastic polyester (B) comprising a butylene terephthalate unit as a main component in an A:B weight ratio of from 99.9:0.1 to 91:9. This stretch molded structure has a decreased stress at the time of stretch molding, and excellent shape appearance. At the same time, it has reduced residual stress, and excellent heat resistance. In addition, it has excellent transparency, mechanical strength and dimensional stability. Furthermore, when this stretch molded structure is used in a heat-resistant container in which at least the body portion is heat-set and the mouth portion or the mouth portion and the center of the bottom portion are heat-crystallized, high producibility can be obtained and the heat-resistance can be markedly increased.

11 Claims, 3 Drawing Sheets

(A-A SURFACE)

STRETCHED MOLDED STRUCTURE AND A PROCESS FOR ITS PRODUCTION

BACKGROUND OF THE INVENTION (1) Field of the Invention

This invention relates to a stretched molded structure composed of a composition comprising polyethylene terephthalate and a very small amount of polybutylene terephthalate, especially a heat-resistant container, and a process for producing the container.

(2) Description of the Prior Art

Among thermoplastic polyesters, polyethylene terephthalate has excellent mechanical properties, chemical resistance and heat resistance, and can increase its rigidity and dimensional stability by stretching and heat-setting, and therefore is used widely as various films, containers, and fibers.

Polybutylene terephthalate belonging to the same thermoplastic polyesters has a lower crystallization temperature than polyethylene terephthalate, and can give fully crystallizable resin products even under injection molding conditions. These products have excellent dimensional stability and heat resistance, and are widely used for the production of electronic components and machine parts.

Many prior proposals have been made in using polyethylene terephthalate (PET) and polybutylene terephthalate (PBT) in the form of a composition. For example, Japanese Patent Publication No. 33832/1975 describes a thermoplastic polyester resin composition composed of 5 to 35% by weight of a polyethylene terephthalate resin and 95 to 65% by weight of a polybutylene terephthalate resin. It is disclosed that this composition does not deteriorate the excellent crystallization properties of PBT, and molding shrinkage and the temperature dependence of the strength, which are the large defects of BBT, can be improved.

As a similar proposal, Japanese Laid-Open Patent Publication No. 8243/1990 discloses a composition composed of 50 to 90% by weight of PBT and 10 to 50% by weight of a copolyester composed of a copolymer of ethylene glycol, cyclohexane dimethanol and terephthalic acid.

Furthermore, Japanese Patent Publication No. 30954/1988 describes a resin composition obtained by compounding a filler, polycaprolactone and a nucleating agent in a polyester composition comprising 95 to 5% by weight of PET and 5 to 95% by weight of PBT.

Recently, Japanese Laid-Open Patent Publication No. 63836/1992 discloses that a crystalline heat-resistant resin container obtained by molding a resin composition comprising 10 to 100 parts by weight of PBT and 90 to 0 parts of PET into a sheet, heating the resin composition at 30° to 100° C. and thereafter molding it by vacuum molding, or molding this composition by a cold parison method, heating this parison at 30° to 100° C., and blow molding it within a high-temperature mold.

Known PET and PBT compositions utilize rapid crystallization properties of PBT, and on the other hand, intend to improve the defect of PBT, which are molding shrinkage and temperature dependence of strength, by compounding PET. Proposal of intending to utilize characteristics other than the crystallization characteristics of PBT is hardly seen.

PET is better than PBT in respect of stretch moldability, mechanical characteristics and thermal resistance of stretch molded products. In stretch molding of polyesters composed mainly of PET, especially in stretch molding them into a container, stress at the time of stretch molding is too large, and the shape appearance of the the container, especially the shape appearance of a bottom structure, is poor. When the resulting stretch-molded structure is heat-set, relaxation of the residual stress is insufficient, and deformation again occurs by heating. Furthermore, when an article having an autogeneous pressure such as a carbonated drink is filled in the container, and is heat-sterilized, the simultaneous action of heat and pressure tends to cause deformation. Therefore, problems to be dissolved still remain.

As disclosed in Japanese Laid-Open Patent Publication No. 30512/1990, when the mold temperature is made high at the time of heat-setting treatment in order to increase heat resistance, a low-molecular-weight component contained in the polyester is transferred to the surface of the mold. Accordingly, surface roughening and clouding are developed on the surface of the container, and incessant cleaning of the mold becomes necessary.

The present inventors compounded various modifying resin with PET to improve these properties. Even a transparent product before stretch-molding tends to have a marked difference in optical properties between resins after stretch-molding, and it is still unsatisfactory.

SUMMARY OF THE INVENTION

The present inventors have found that when a limited very small amount of polybutylene terephthalate is added to polyethylene terephthalate, excellent transparency can be obtained of course before stretch-molding and even after stretch-molding, and when the stress at the time of stretch-molding is decreased to impart an excellent shape appearance and to decrease the residual stress in the molded product, and when the mouth portion remaining unstretched or the mouth portion and the center of the bottom portion are heat-crystallized, a larger crystallization speed is obtained than the polyethylene terephthalate alone, and heat resistance can be markedly increased.

It has further be found that since residual stress is rapidly relaxed even in the case of heat-setting, shortening of the heat-setting time and the lowering of the heat-setting temperature are possible, and these are effective for increasing the productivity.

It is an object of this invention to provide a polyester stretch-molded product having excellent transparency, mechanical strength, and dimensional stability, and simultaneously, excellent shape appearance as the stress at the time of stretch-molding is decreased, and excellent heat resistance with a decreased residual stress.

It is another object of this invention to provide a polyester stretch-molded container having excellent transparency, appearance of bottom shape, etc., heat resistance, and dimensional stability.

It is still another object of this invention to provide a heat-set polyester stretch-molded container, which can be produced with a high producibility by shortening the heat-setting time and lowering the heat-setting temperature.

It is still another object of this invention to provide a heat-resistance polyester container having excellent transparency, mechanical strength and dimensional stability at a container body portion and having excellent rigidity and heat resistance with the mouth portion or the mouth portion and the center of the bottom portion being hot-crystallized, and a process for producing the container.

It is a further object to provide a polyester stretch molded container which has heat resistance and pressure resistance and has little deformation when heat and pressure act simultaneously on the container, in which the mouth portion or the mouth portion and the bottom portion are highly crystallized and a process for production of the container.

According to this invention, there is provided a stretched molded structure formed of a polyester composition comprising a thermoplastic polyester (A) composed mainly of an ethylene terephthalate unit and a thermoplastic polyester (B) composed mainly of a butylene terephthalate unit in a weight ratio of A:B of 99.9:0.1 to 91:9. When heat-set, this structure shows especially remarkable effects.

Furthermore, this stretched molded structure is a heat-resistant polyester container, or a heat-pressure-resistant polyester container wherein at least its body portion is stretched, and the mouth portion or the mouth portion and the center of the bottom portion are heat-crystallized.

According to another preferred embodiment, there are provided a stretched molded heat-set container and a stretched molded heat-set film.

Preferably, the ethylene terephthalate polyester (A) has an intrinsic viscosity of 0.4 to 1.5 dl/g, and the butylene terephthalate polyester (B) has an intrinsic viscosity of 0.4 to 1.5 dl/g.

According to this invention, there are also provided a heat-resistant polyester container and a method of producing a heat-pressure-resistant polyester container, which comprises melt-molding a thermoplastic polyester into an amorphous bottom-containing preform having a mouth portion and a bottom portion, and stretch-molding the preform axially and peripherally, wherein a polyester composition comprising a thermoplastic polyester (A) having an ethylene terephthalate unit as a main component and a thermoplastic polyester (B) having an butylene terephthalate unit as a main component as is used in an A:B weight ratio of 99.9:0.1 to 91:9 as a thermoplastic polyester, and prior to stretching, selectively heat-treating the mouth portion or the mouth portion and the center of the bottom portion of the preform are selectively heat-set and to crystallize (heat-crystallize) said portion or portions to produce a heat-resistant polyester container.

DETAILED DESCRIPTION OF THE INVENTION

The composition used in this invention is markedly characterized in that it comprises a thermoplastic polyester (A) comprising an ethylene terephthalate unit as a main component and a thermoplastic polyester (B) comprising a butylene terephthalate unit as a main component, and the butylene terephthalate polyester (B) is used in a limited very small amount, namely in an amount of 0.1 to 9% by weight, especially 0.5 to 5% by weight, on the basis of two components in total.

Polybutylene terephthalate (PBT) generally has a glass transition point (Tg) of 20° to 40° C. and a melting point (Tm) of 210° to 230° C. Its melting point is lower than that of polyethylene terephthalate (PET) but its crystallization easily takes place at a larger glass transition point which is lower than that of polyethylene terephthalate.

However, when PBT is present as a single phase or when it is present as a blend of another polymer, if the amount of PBT is above the minimum limit, its crystallization becomes possible. This is because if the amount becomes small in the blend, dispersed particle size becomes small, and if the dispersed particle size is smaller than a certain limit, they can no longer exist as crystals stably.

A blend of specific proportions of an ethylene terephthalate polyester and a butylene terephthalate polyester is a composition in which the ethylene terephthalate polyester cannot exist as stable crystals irrespective of its temperature. According to this invention, by using this composition for stretching and molding, remarkable operational effects can be obtained. At the same time, in the production of a polyester container, the mouth portion or the center of the bottom portion in a non-stretched state can be heat-stabilized.

When another resin is blended with an ethylene terephthalate polyester, the blend is stretched and molded to become opaque in view of the difference of the optical properties of various components, and stated above. The composition of this invention has excellent transparency even when it is stretch molded at a high ratio, and does not at all develop fibrillation tendency which is seen in the high ratio stretching of the blend. This is presumably because the butylene terephthalate polyethylene has good affinity for the ethylene terephthalate polyester, and in the above-mentioned ratio, it is dispersed in a markedly fine form in a continuous phase of the terephthalate polyester.

Figure 7:
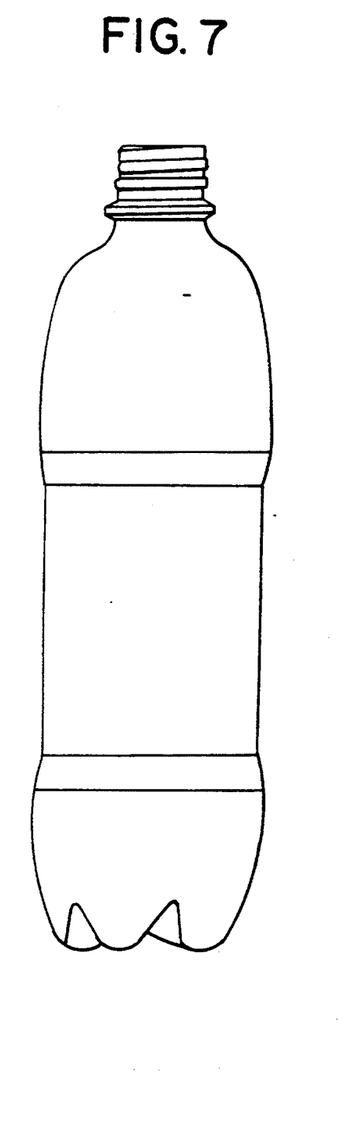
FIG. 7 is a side view of a carbonate drink container molded in Example 5 and Comparative Example 3.
Figure 8:
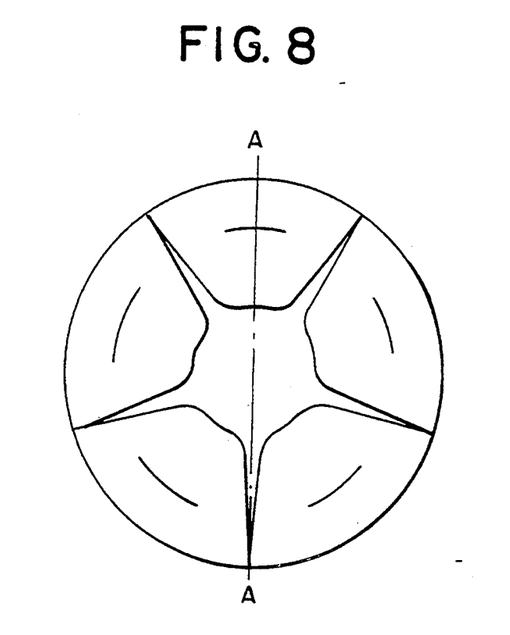
FIG. 8 is a bottom view of the container of FIG. 7.
Figure 9:
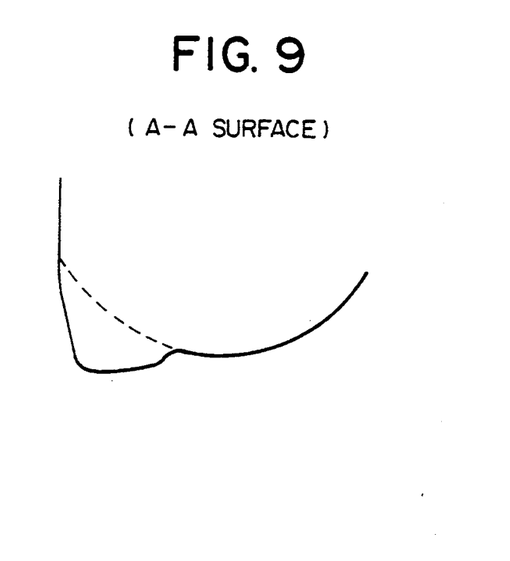
FIG. 9 is a sectional view of the bottom portion of the container of FIG. 7.

When this composition is stretch molded, the stress at the time of stretch molding can be decreased as compared with an ethylene terephthalate polyester alone. Furthermore, the workability of stretch molding can be increased, and in molding it into a container, the structure of a fine portion can be developed correctly. For example, in a polyester container for filling a carbonated drink, etc., pressure resistance and self-supporting property are imparted to the container simultaneously. It is general to provide a plurality of bulging portions in the periphery of the bottom portion of the container (FIG. 7 shows a side view of the container; FIG. 8 shows a bottom view; and FIG. 9 shows a sectional view of the bottom portion). In the present invention, by decreasing the stress at the time of stretch molding, the bottom shape of the container can be easily made in the form of bottom shape of a mold shape.

Figure 1:
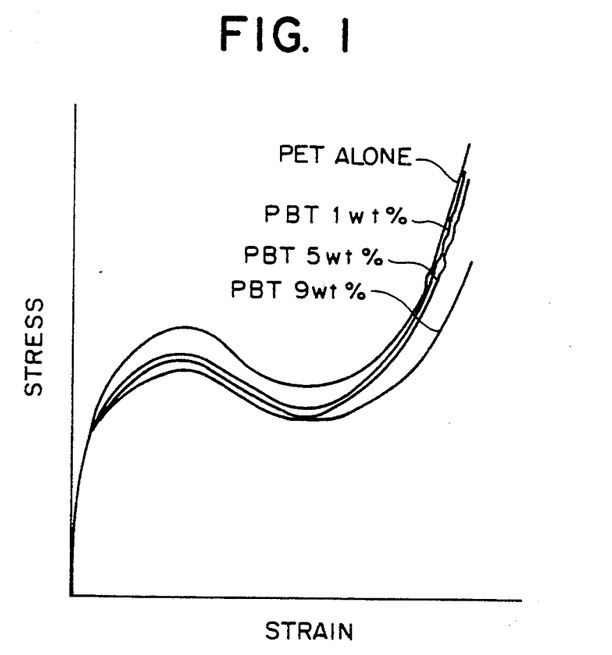
FIG. 1 is a stress-strain curve in one stretching direction of each of compositions obtained by compounding various amounts of butylene terephthalate polyesters in ethylene terephthalate polyesters which are biaxially stretched at a stretch-molding temperature (110° C.).

FIG. 1 is a stress-strain curve in one stretching direction when each of compositions obtained by compounding various amounts of a butylene terephthalate polyester with an ethylene terephthalate polyester and biaxially stretching the composition at a stretch-molding temperature (110° C.). It is clear that the stress value per fixed strain decreases by the compounding of a butylene terephthalate polyester.

The reason is considered that a butylene terephthalate polyester dispersed uniformly and finely in the ethylene terephthalate polyester activates molecular chain motion and plasticizes the blend and its flowability increased.

Table 2 clarifies that since a very small amount of butylene terephthalate polyester is compounded with an ethylene terephthalate polyester, an unexpected effect of increasing the reached crystallization degree per unit time is obtained in comparison with an ethylene terephthalate polyester alone.

Figure 2:
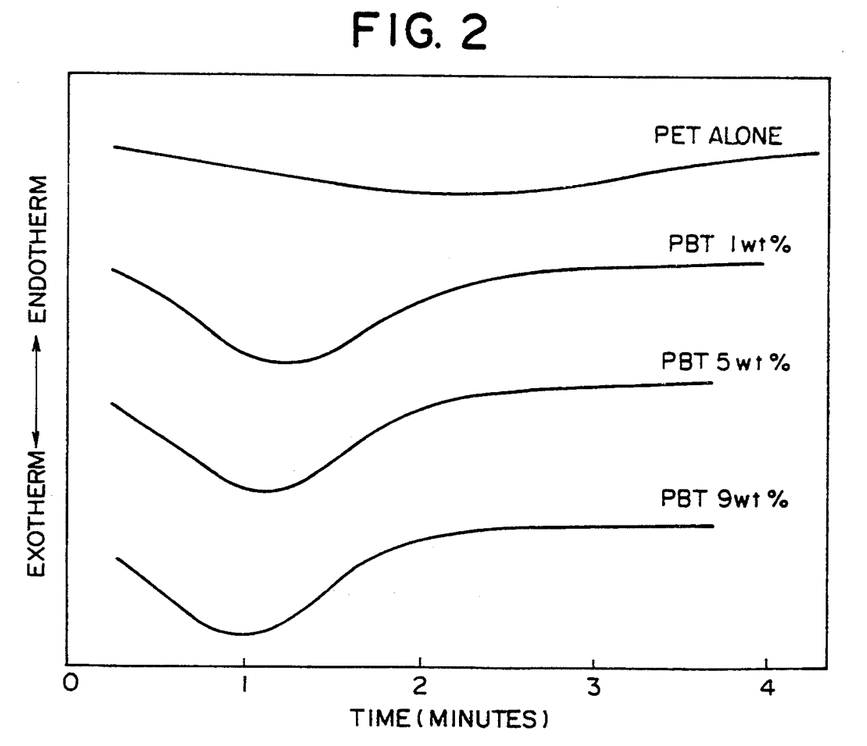
FIG. 2 is a graph comparing exothermic peaks of compositions which are obtained by compounding PET and PBT in various quantitative ratios and which are measured without stretching incident to heat-crystallization at 130° C. by DSC.

FIG. 2 shows a comparison of exothermic peaks of unstretched compositions obtained by compounding PET with PBT in various weight ratios, which accompanied heat-crystallization at 130° C. measured by DSC. In this measurement, 6 to 8 mg of a sample is abruptly heated to 130° C. from room temperature (320° C./min.), and held at 130° C. Variations based on time were measured.

According to these results, PBT shows a larger heat-crystallization speed than PET, and in PET, a considerably long induction period is recognized for heat-crystallization, but in a composition containing PET compounded, this induction period is clearly shortened. This is because as already pointed out with respect to heat-setting, butylene terephthalate polyester present as a fine dispersed phase is easy to move, ethylene terephthalate polyester is easy to move in molecular chains, and consequently, heat-crystallization by re-arrangement rapidly proceeds. According to this invention, the mouth portion or the mouth portion and the center of the bottom portion can be highly and rapidly heat-crystallized, and marked advantages such as heat resistance and productivity can be obtained.

When a stretch molded product formed from this composition is subjected to heat-treatment such as heat-setting, the residual stress is easily relaxed. Furthermore, since orientation and crystallization proceed to a more degree, favorable actions, for example increasing of the heat resistance and dimensional stability of the molded article, can be brought about. Furthermore, since the heat-setting treating time is shortened, high productivity can be obtained. Furthermore, by lowering the treating temperature, the adhesion of foreign matter to the mold can be very much decreased, and a complicated mold clearing operation can be saved. Furthermore, the production efficiency can be increased. This is because the butylene terephthalate polyester present as a finely dispersed phase is liable to move, the molecular chain of the ethylene terephthalate polyester becomes easy to move, and this makes it possible to relax residual stress and to orient and crystallize by re-arrangement.

It is important that in the present invention, the compounded amount of the butylene terephthalate polyester should be in the above-mentioned range. If it is larger than the above range, opacification of the stretch molded product or fibrillation (the tendency of the container surface becoming lacking, or of cracks being developed) occurs. Furthermore, undesirable effects due to crystallization of the butylene terephthalate polyester, such as whitening of a portion excluding a heat-crystallized mouth portion of the container and the decrease of stretch moldability, are undesirably developed. On the other hand, when the compounded amount is below the above range, the improvements intended by the inventors, namely the increase of stretch moldability, the increase of heat-crystallization in the mouth portion or the mouth portion and the center of the bottom portion, and an improvement of dimensional stability and heat resistance, cannot be achieved.

DETAILED DESCRIPTION OF THE PREFERRED EMBODIMENTS (Ethylene terephthalate thermoplastic polyesters)

Preferably, the ethylene terephthalate thermoplastic polyesters used in this invention generally have at least 60 mole %, especially at least 80 mole %, of ethylene terephthalate unit, a glass transition point (Tg) of 50° to 90° C., especially 70° to 90° C., and a melting point (Tm) of 220° to 260° C., especially 240° to 260° C.

Homopolyethylene terephthalate is preferred in respect of heat resistance. But copolymerized polyesters containing a small amount of an ester unit other than the polyethylene terephthalate unit may also be used.

Dibasic acids other than terephthalic acid may include one or combinations of at least two types selected from aromatic dicarboxylic acids such as isophthalic acid, phthalic acid and naphthalenedicarboxylic acid; aliphatic-cyclic dicarboxylic acids such as cyclohexanedicarboxylic acid; and aliphatic dicarboxylic acids such as succinic acid, adipic acid, sebacic acid and dodecanedioic acid. Examples of a diol component other than ethylene glycol include at least one member selected from propylene glycol, 1,4-butanediol, diethylene glycol, 1,6-hexylene glycol, cyclohexane dimethanol, and an ethylene oxide adduct of hisphenol A.

The ethylene terephthalate thermoplastic polyesters to be used should have a molecular weight which is at least sufficient to form a film, and according to utility, they may be of an injection grade or an extrusion grade. The polyesters generally have an intrinsic viscosity (I. V.) of 0.4 to 1.5 dl/g, especially 0.5 to 1.1 dl/g.

(Butylene terephthalate thermoplastic polyesters)

The butylene terephthalate polyesters used in this invention comprise a greater portion of an ester recurring unit, generally at least 60 mole %, especially at least 80 mole %, of a butylene terephthalate unit, and has a glass transition point (Tg) of 20° to 40° C., especially 25° to 35° C., and a melting point (Tm) of 200° to 240° C., preferably 210° to 230° C. Homopolybutylene terephthalate is preferred in respect of heat resistance. But copolymerized polyesters containing a small amount of an ethylene unit other than the butylene terephthalate unit may also be used.

Dibasic acids other than terephthalic acid may include one or combinations of at least two types selected from aromatic dicarboxylic acids such as isophthalic acid, phthalic acid and naphthalenedicarboxylic acid; aliphatic-cyclic dicarboxylic acids such as cyclohexanedicarboxylic acid; and aliphatic dicarboxylic acids such as succinic acid, adipic acid, sebacic acid and dodecanedioic acid. Examples of a diol component other than butylene glycol include at least one member selected from ethylene glycol, propylene glycol, diethylene glycol, 1,6-hexyleneglycol, cyclohexanedimethanol, and an ethylene oxide adduct of bisphenol A.

The butylene terephthalate thermoplastic polyesters used should have a molecular weight which is at least sufficient to form a film. These thermoplastic polyesters desirably have an intrinsic viscosity (I. V.) of generally 0.4 to 1.5 dl/g, especially 0.7 to 1.5 dl/g.

(Polyester composition)

In the present invention there is used a polyester composition containing an ethylene terephthalate polyester (A) and a butylene terephthalate polyester (B) in an A:B weight ratio of 99.9:0.1 to 91:9, especially 99.5:0.5 to 95:5.

The the polyester composition is characterized in that a very small amount of the butylene terephthalate polyester is uniformly dispersed very finely in a large amount of the ethylene terephthalate polyester. When the butylene terephthalate polyester is heated at a temperature of at least its glass transition point, it exists in a fine condition in which the polyester is not substantially crystallized.

To form the above-mentioned fine and homogeneous dispersed state, dry-blending is desirable in this invention. A mixing or kneading method by a so-called master batch may be used. A composition of butylene terephthalate polyester/ethylene terephthalate polyester containing a large amount of the butylene terephthalate polyester is prepared, and this composition is mixed or kneaded with ethylene terephthalate polyester. This operation of mixing or kneading can be performed in multistages such as at least two stages.

The operation of mixing or kneading is performed by dry-mixing using a blender or a Henschel mixer, and thereafter, melt-kneading the mixture by using various kneaders or monoaxial or biaxial extrusion-type melt-kneading apparatuses.

(Production of a stretch molded product)

According to this invention, the above polyester composition is melt-molded by a known means, and this preform is then stretch molded to obtain a predetermined final stretch molded product. The melt molding of the preform can be carried out by injection molding and extrusion molding.

In injection molding, the composition is melt-injected into a cooled injection mold. Known injection molding machines equipped with an injection plunger or screw may be used. The above mixture is injected into the above injection mold through a nozzle, a spray, or a gate. By this operation, the polyester composition flows into an injection mold cavity, and is hardened to become a preform for stretch blow-molding. Injection molds having a cavity corresponding to the shape of the container may be used. It is preferred to use a one gate-type or multi gate-type injection mold. Preferably, the injection temperature is 250° to 310° C., and the pressure is about 100 to 200 kg/cm$^3$.

In the case of extrusion molding, the extruder to be used may be one containing any desired screw. Dies for the molding of preforms in the form of tubes, pipes and parisons, such as ring dies and dies for the molding of preforms in the form of films or sheets, such as flat dies may be used. The suitable temperature of the head of the extruder may be preferably 250° to 310° C.

To heat-crystallize the mouth portion of the container or the mouth portion and the center of the bottom portion at the container, it is preferably carried out in the form of a preform before stretch molding. But after stretch molding, the mouth portion of the container may be heat-crystallized. When a preform is molded by injection molding, an amorphous preform obtained after molding is processed preferably such that the mouth portion or the mouth portion and the center of the bottom portion are selectively heated to heat-crystallize the mouth portion or the mouth portion and the center of the bottom portion to subject the preform to stretch molding.

The heat-crystallization of the mouth portion or the mouth portion and the center of the bottom portion may be carried out generally at a temperature of 100° to 220° C., especially 150° to 200° C. The heating time is carried out such that only the mouth portion or only the mouth portion and the center of the bottom portion may be selectively heated, and as required, a heat insulator means is provided at a portion other than the mouth portion or the mouth portion and the center of bottom portion, and the heating may be carried out by known heating means such as infrared ray heating, hot air heating or induction heating. This heating results in heat-crystalllization of the polyester composition at the mouth portion or the mouth portion and the center of the bottom portion, and its rigidity and heat resistance are markedly increased. Furthermore, crystallization may involve whitening.

Stretch molding of the preform is carried out first by producing a preform in an overcooled state, heating the preform at a stretching temperature to carry out stretch molding, and performing stretch molding following preliminary molding by utilizing the heat given to the preform molded, namely by utilizing remaining heat. According to the latter method, the heat-crystallization of the mouth portion or the mouth portion and the center of the bottom portion may be carried out after stretch molding.

The suitable stretching temperature is 80° to 200° C., especially 90° to 120° C. The stretching may be carried out monoaxially or biaxially. The stretch molding may be employed by any known means according to the shape or the required characteristics of the molded product.

In the case of a hollow-molded container such as a bottle, a preform or parison at a stretching temperature is pulled and stretched axially within a blow-molding mold, and is bulged and stretched in a peripheral direction by fluid blowing. The stretching ratio is preferably 1.0 to 5.0 times, especially 1.5 to 4.0 times, in an axial direction and 2.0 to 6.0 times, especially 2.5 to 5.5 times in a peripheral direction.

In the case of molding a sheet to produce a container, a sheet or preform at a stretching temperature is stretch molded axially by means such as plug assist molding, pressure forming, vacuum forming and press forming, The stretch ratio should be adjusted such that the draw ratio (height/diameter) should preferably be 0.2 to 3.0 times, especially 0.5 to 2.0 times.

In the case of a film, an unstretched film at a stretching temperature is stretched longitudinally between a pair of rollers having different peripheral speeds, and thereafter stretched in a crosswise direction by a tenter. The stretch ratio may be adjusted to 1.5 to 6.0 times, especially 2.0 to 4.0 times in a longitudinal direction, and to 1.0 to 6.0 times, especially 2.0 to 4.0 times in a crosswise direction.

When prior to stretching, the mouth portion and the center of the bottom portion of the preform are selectively heated to crystallize them and used, a portion adjoining the mouth portion and the center of the bottom portion is used as a stretch initiating point and stretched and thinned. Accordingly, the resulting product has especially excellent resistance to heat and pressure.

The stretch molded product of this invention is markedly characterized in that the heat-setting proceeds rapidly and effectively. This heat-setting is carried out by heat-treating the stretch molded product under tension at a temperature of 120° to 220° C., especially 130° to 180° C. This heat-setting effectively relaxes the residual stress of the stretch molded product, and its orientation and crystallization proceed effectively.

In the case of a stretch blow molded container, the heat-setting may be carried out by a one mold method or a two mold method. According to the one mold method, the blow molding mold is heated at the abovementioned temperature, and the molded container contacts the surface of the mold to perform heat-setting. The heat-setting may be carried out within a short period of time by using a high-temperature gas as a fluid to be blown into the container. The heat-set container is cooled to a temperature at which its shape holding property can be maintained, and thereafter, taken out of the mold. In the two mold method, a heat-setting mold heat to a high temperature is used in addition to a blow molding mold, the molded container is placed in the heat-setting mold, and this container is heat-set by contacting it with the surface of the mold in which a fluid pressure is added.

The sheet molded container may be similarly heat-set by heating a molding female mold at a high temperature, and contacting the molded container with the surface of the mold while a fluid pressure is added. The biaxially stretched film may be heat-set by contacting the film in a tensioned state with a heating medium.

(Stretched molded structure)

The stretched molded structure of this invention is maintained to give excellent transparency even when it is stretch molded at a high drawing ratio in spite of the fact that a butylene terephthalate polyester is included in an ethylene terephthalate polyester. Furthermore, the blend is quite free from a fibrillation tendency which is frequently seen in stretching at a high draw ratio of the blend. The transparency and impact resistance of the stretched molded structure are almost the same as those of the ethylene terephthalate polyester alone.

Since the stretched molded product of the invention, especially a container, can decrease the stress at the time of stretch molding as compared with the ethylene terephthalate polyester alone, it is advantageous to develop the structure of particular portions in the molding of a container. For example, in the case of a polyester container for filling a carbonate drink, etc., this is important in simultaneously imparting pressure resistance and self-supporting property based on the structure of the container.

In the stretched molded structure of the present invention, it is advantageous that stress at the time of stretch molding is decreased, and since stretching is possible at a high speed and at a high ratio, molecular orientation is carried out to a high degree. The degree of biaxial orientation of the polyester may be determined by a polarizing fluorescent method, a birefringence method, a density-gradient tube method, and an X-ray diffraction method. According to this invention, it is possible to give molecular orientation so that the refractive index in the main stretching direction measured by using an Abbe's refractometer is at least 1.60, especially at least 1.62.

When the stretch molded structure of this invention is heat-set, it is especially excellently advantageous that residual stress is markedly decreased as compared with the ethylene terephthalate polyester alone, and orientation and crystallization can be obtained effectively. The degree of orientation crystallization can be evaluated by the density. But the polyester molded product of this invention is molecularly oriented and heat-set so that it has a density of at least 1,350 g/cm$^3$, especially at least 1,365 g/cm$^3$.

In the container of this invention, heat-crystallization of the mouth portion is carried out effectively, and the rigidity and heat deformation of the mouth portion are excellent. Accordingly, it advantageously has excellent sealing precision and heat resistance and sealing reliability. Furthermore, it is advantageous that when the stretched body portion is heat-set, there can be obtained excellent heat resistance, especially high heat deformability resistance, and mechanical properties at high temperatures.

Figure 3:
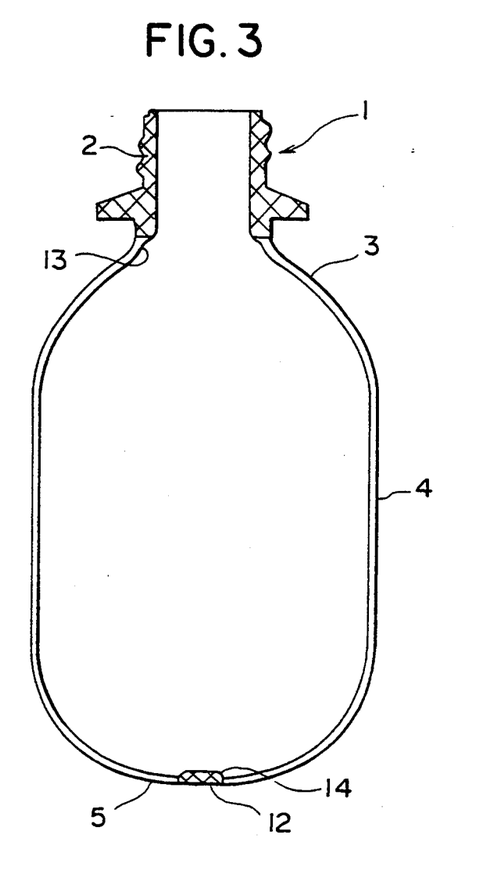
FIG. 3 is a sectional view of one example of the structure of a biaxially stretched polyester container of this invention.

In FIG. 3 (sectional view) showing one example of the structure of the biaxially stretched polyester container of this invention, the biaxially stretched polyester container 1 is composed of a mouth portion (nozzle portion) 2, a truncated conical shoulder portion 3, a cylindrical body portion 4 and a closed bottom portion 5. At the bottom portion, the center 12 of a thick portion exists. The mouth portion 2 and the center 12 of the bottom portion are heat-crystallized, and are thicker than the body portion 4. They have the same thickness as the preform. These mouth portion 2 and the center 12 of the bottom portion are crystallized so as to have a crystallization degree by a density method (XC) of at least 25%. Its crystal structure is spherulite-shaped (lameliar). A portion excluding the mouth portion 2 and the center 12 of the bottom portion is abruptly thinned via a level-difference portion 14 adjoining the center of the bottom portion and a level-difference portion 13 adjoining the mouth portion, and is molecularly oriented to a high degree.

Figure 4:
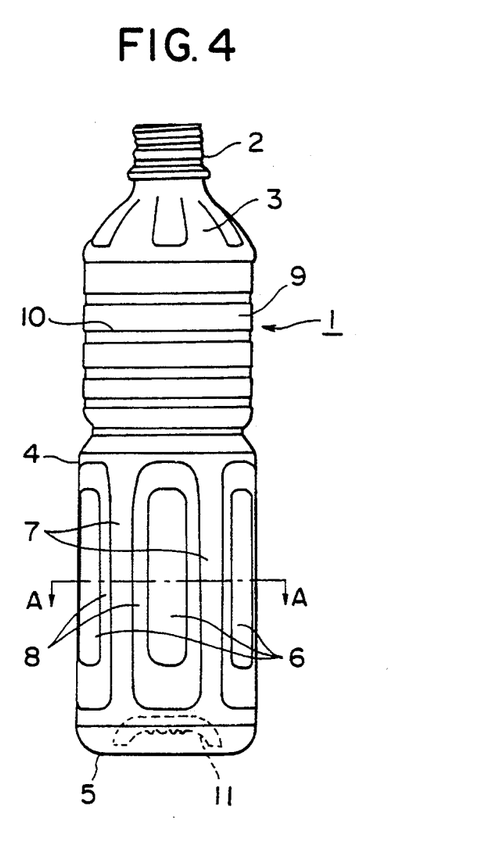
FIG. 4 is a side view of another example of the structure of a biaxially stretched polyester container of this invention.
Figure 5:
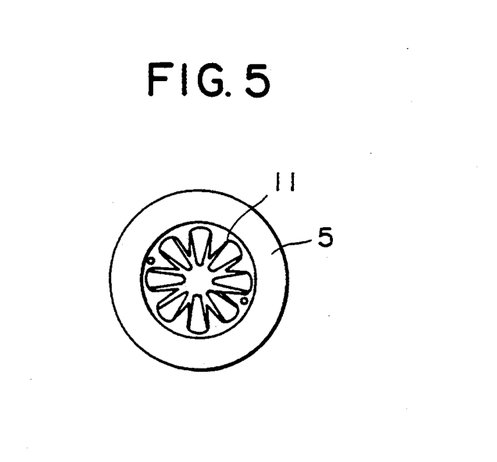
FIG. 5 is a bottom view of the container of FIG. 4.
Figure 6:
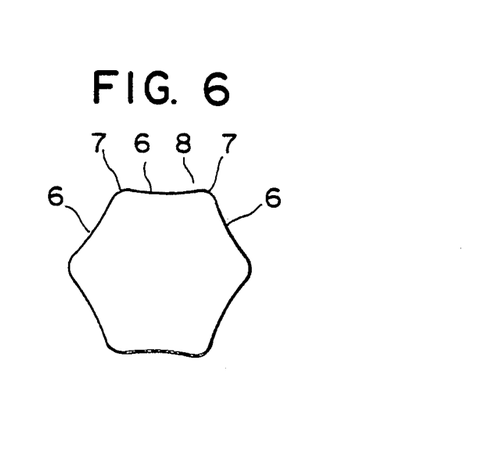
FIG. 6 is a sectional view of the container of FIG. 4.

In FIG. 4 (side view), FIG. 5 (bottom view), and FIG. 6 (sectional view) showing other examples of the structure of the biaxially stretched polyester container of this invention, the biaxially stretched polyester container 1 is composed of a mouth portion (nozzle portion) 2, a truncated conical shoulder portion 3, a cylindrical body portion 4 and a closed bottom portion 5, and the mouth portion 2 is heat-crystallized. The main portion of the body portion 4 is composed of many alternately peripherally provided pillar convex portions 7 having a relatively large diameter and a short peripheral length and panel-like concave portions 6 via a short linking portion 8. The pillar convex portions 7 extend in the axially direction (height direction) of the container and therefore, the panel-like concave portions 6 have a shape of a rectangular form whose long angle is rounded in the axial direction of the container partitioned by the pillar convex portions 7.

As can be seen from the sectional view of FIG. 6, the panel-like concave portions 6 can be bulged (projected) outwardly of the diameter by an increase in the internal pressure and can be shrunken (sunken) inwardly by a decrease in the internal pressure. This has an action of relaxing variations in internal pressure.

In the specific example shown in the drawings, above a portion on which the panel-like convex portions are placed, a bulging ring portion 9 having a relatively large diameter and an adjoining groove-like ring portion 10 having a relatively small diameter are provided, to permit some deformation axially of the container. Furthermore, at the central portion of the bottom portion 5, there is a concave portion 11 inwardly of a star-like shape to prevent the pressure of the bottom portion 5 and buckling outwardly by heat deformation. In the container of this invention, the above-mentioned shape is faithfully reproduced as designed and various portions after molding are relaxed in stress, and orientation and crystallization are performed fully. Accordingly, excellent heat deformation resistance can be obtained.

EXAMPLES

The following examples will illustrate the present invention.

A hot pack test was carried out as an evaluation of the heat resistance of containers. The containers were preserved for 6 hours in an atmosphere maintained at 30° C. and 80% RH. Hot water at 87° C. was filled to a predetermined indicator line, and the containers were immediately sealed up, They were fallen crosswise for 1 minute, then placed upstandingly for 4 minutes, and thereafter cooled in water. When the heat resistance was insufficient, deformation occurs at the panel-like concave portion 6 of the containers having the shape shown in FIG. 4. The heat resistance was evaluated by the presence or absence of deformation at this portion.

The intrinsic viscosity of the resin used was determined in accordance with the following formula. The resin was dissolved in a concentration of 1 g/100 ml in a mixed solvent (weight ratio) of phenol and 1,1,2,2-tetrachloroethane (50:50). The falling time at 30° C. was determined by using an Ubbelhde's viscometer.

$$[\eta] = \frac{-1 + \sqrt{1 + 4k'\eta_{sp}}}{2K'C}$$

[η]: intrinsic viscosity (dl/g)
$\eta_{sp}$: specific viscosity
K': Higgins' constant (0.33)
C: concentration (=1 g/100 ml)

The crystallization degree was determined by first sheeking a density from a 20° C. carbon tetrachlorine-n-heptane type density-gradient tube, supposing that the butylene terephthalate component does not crystallize, and calculating the fraction of a crystalline region in the ethylene terephthalate component.

$$X = \frac{dc\left[\left\{1 + \left(\frac{da - db}{db}\right)C\right\}d - da\right]}{d(dc - da)(1 - C)} \times 100 \, (\%)$$

wherein x: crystalinity (%)
d: the density (g/cm³) of the sample
da: the density (g/cm³) of an amorphous region of the ethylene terephthalate component
db: the density (g/cm³) of an amorphous region of the butylene terephthalate
dc: the density (g/cm³) of a crystalline region of the ethylene terephthalate component
C: the weight fraction of the butylene terephthalate component Example 1 and Comparative Example 1

As Example 1, polyethylene terephthalate having an intrinsic viscosity (I. V.) of 0.75 dl/g and polybutylene terephthalate having an I. V. of 1.3 dl/g were mixed at a weight ratio of 99:1. The mixture was molded by an injection molding machine at 290° C. to form a preform (diameter 28 mm, weight 59 g). The nozzle portion was not stretched at the time of blow molding, and in order to impart heat resistance, only the nozzle portion was heated and crystallized. This preform was re-heated at 115° C., then transported into a mold of the blow molding machine, stretched axially by a stretch rod, and immediately a high pressure air was blown into the stretched preform to prepare a bottle having the shape shown in FIG. 4 (inner capacity 1.5 liters; the average thickness of the body portion 0.35 mm). At this time, a blow mold was heated in advance, and the heat-setting was carried out by a one mold method. In correspondence to this, the same PET as used in Example 1 was used alone, and molded into bottles.

The heat-setting was carried out for a time of 2, and 4 seconds at a mold temperature of 135°, 140° and 145° C. The heat resistances were compared by means of the hot pack test. The results are shown in Table 1. In the table, shows that no deformation was seen in the panel-portion; shows that a small penetration which regained to the original state by lightly pushing the container formed on one surface; and x shows that a deformation which could not regain developed on at least one surface.

It is clear from this table that in Example 1, sufficient heat resistance was obtained within a short period of time at a lower temperature.

TABLE 1

| | Time (sec.) | Temperature of the mold (°C.) | | |
|---|---|---|---|---|
| | | 135 | 140 | 145 |
| Example 1 | 2 | X | Δ | O |
| | 4 | O | O | O |
| Comparative Example 1 | 2 | X | X | X |
| | 4 | X | Δ | O |

EXAMPLES 2, 3 and 4

In Example 1, the weight mixing ratio of PET and PBT was changed to 99.5:0.5, and the resulting polyester was used in Example 2. In Example 1, the weight mixing ratio was changed to 95:5, and the resulting polyester was used in Example 3. Furthermore, the same PET and PBT were mixed at a weight ratio of 90:10 and the mixture was melt kneaded at 270° C. by a biaxial extruder to form a masterbatch. The masterbatch and PET were mixed at a weight ratio of 10:90 (finally the ratio of PBT becomes 1% by weight). The resulting polyester was thus obtained in Example 4. Molding of bottles was carried out in the same way as in Example 1, and the heat-setting was carried out for 2 seconds at a mold temperature of 145° C. When these bottles were subjected to the hot pack test, no deformation was seen in any of the bottles.

Comparative Example 2

In Example 1, PET and PBT were mixed at a weight mixing ratio of 80:20, and bottles were molded in the same way as in Example 1. However, whitening occurred in the stage of re-heating of the preform, and transparent bottles could not be obtained.

EXAMPLE 5

PET having an I. V. of 0.83 dl/g was mixed with PBT having an I. V. of 1.3 dl/g at a weight ratio of 97:3, and the mixture was molded by an injection molding machine to form a preform (diameter 28 mm, weight 49 g). In Example 5, a carbonate drink bottle shape having a bulging portion for self-supporting (FIG. 7 shows a side view of the container; FIG. 8 shows a bottom view; and FIG. 9 shows a sectional view) was used. The nozzle portion of the preform was not heat-crystallized, and the heat-setting at the time of blowing was not performed. The molded preform was re-heated to 110° C., and transferred into a blow mold. Thereafter, the preform was stretched axially by a stretch rod, and immediately compressed air at 35 kgf/cm² to mold bottles (inner capacity 1.5 liters, an average thickness of the body portion 0.32 mm). The molded bottles completely transferred the shape of the mold to the forward end of the bulging portion.

Comparative Example 3

In Example 5, bottles were molded in the same way except that PET having an I. V. of 0.83 dl/g was used alone. However, the shape of the bulging portion was not completely transferred.

EXAMPLE 6

Polyethylene terephthalate (PET) having an intrinsic viscosity (I. V.) of 0.75 dl/g and polybutylene terephthalate (PBT) having an intrinsic viscosity of 1.3 dl/g were mixed in various weight ratios shown in Table 2, and the mixture was molded at a molding temperature of 290° C. by an injection molding machine to form a preform (diameter 28 ram, weight 59 g). In Table 2, 1 represents a PET alone; 2,3,4 and 5 represent a dry blending; and 6 and 7 show that PET and PBT are mixed in a weight ratio of 90:10, the mixture is melt-kneaded at 270° C. by a biaxial extruder and the product is used as a masterbatch, and the masterbatch is mixed so that weight ratio of PET and PBT finally becomes the value shown in the table.

To make a comparison between materials, the output of an infrared heater was maintained constant in the step of crystallizing the mouth portion, and heat crystallization was carried out by varying the heating time.

Thereafter, the preform was re-heated to 115° C., transferred into a mold of a blow molding machine, stretched axially by a stretch rod and high pressure air was immediately blown to mold bottles having the shape shown in FIG. 3 (inner capacity 1.5 liters, an average thickness of the body portion 0.35 mm). At this time, a blow mold was heated to 145° C. in advance, and the molded product was heat-set by a one mold method. In the material 4 in Table 2, the bottle was whitened, and therefore, the re-heating temperature was lowered to 105° C. to obtain a transparent bottle. With the material 5, the re-heating temperature was lowered. But a transparent bottle was not obtained.

To evaluate each of the molded bottles, a small piece having an angle of about 3 mm was cut out from the forward end of the mouth portion, and the crystallinity was measured. The results are shown in Table 2. When the heat crystallization of the mouth portion is insufficient, the mouth portion was deformed at the time of capping immediately after filling. Or the contents are leaked out after cooling, or loosening of the clamping of the cap occured. The crystallization degree required depends upon the thickness and shape of the mouth portion, material of the cap, its designing, or the clamping torque of the cap, and cannot be generalized. Generally, it is at least 25%, desirably at least 35%. When Table 2 is seen, the heat crystallization degree of the mouth portion of the bottle molded from PET alone is adjusted to at least 35% so that a time of at least 80 seconds is required. But with a bottle in which PBT is blended with PET, the heat crystallization degree reaches 35% within 70 seconds. Accordingly, the heating time can be shortened by at least 10 seconds.

Where the heat crystallization degree of the mouth portion was fully high, a hot pack test was conducted. No problem of deformation occurred in any of the bottles, and they showed full heat resistance.

TABLE 2

| Mixing ratio (PET/PBT) | Heating time (seconds) | | | | |
|---|---|---|---|---|---|
| | 60 | 65 | 70 | 80 | 90 |
| 1 100/0 Dry blend | 5.0 | 15.5 | 29.0 | 34.5 | 39.0 |
| 2 99/1 | 20.0 | 32.5 | 36.0 | 38.0 | 41.0 |
| 3 95/5 | 25.0 | 35.0 | 37.5 | 38.5 | 41.5 |
| 4 91/9 | 29.0 | 36.5 | 39.0 | 40.5 | 42.5 |
| 5 80/20 melt blend | 31.5 | 37.5 | 40.0 | 42.0 | 44.5 |
| 6 99.5/0.5 | 17.5 | 30.5 | 36.0 | 38.5 | 41.0 |
| 7 99/1 | 21.0 | 33.5 | 37.0 | 39.0 | 41.5 |

What is claimed is:

1. A heat-resistant polyester container, characterized in that it is formed from a polyester composition containing a thermoplastic polyester (A) comprising an ethylene terephthalate unit as a main component and a thermoplastic polyester (B) comprising a butylene terephthalate as a main component in an A:B weight ratio of from 99.9:0.1 to 91:9, and at least the body portion is stretched and heat-set, and the mouth portion or the mouth portion and the center of the bottom portion are crystallized.

2. A heat-pressure-resistant polyester container, characterized in that it is formed from a polyester composition containing a thermoplastic polyester (A) comprising an ethylene terephthalate unit as a main component and a thermoplastic polyester (B) comprising a butylene terephthalate unit as a main component in an A:B weight ratio of from 99.9:0.1 to 91:9, and the mouth portion or the mouth portion and the bottom portion are crystallized.

3. A polyester container of claim 1 or 2 wherein the mouth portion or the mouth portion and the center of the bottom portion are heat-crystallized so that it or they have a crystallization degree of at least 25%.

4. A polyester container of claim 1 or 2 wherein the ethylene terephthalate polyester (A) has an intrinsic viscosity of 0.4 to 1.5 dl/g, and the butylene terephthalate polyester has an intrinsic viscosity of 0.4 to 1.5 dl/g.

5. A polyester container of claim 1 or 2 wherein the body portion is heat-set.

6. A heat-resistant polyester container of claim 1, wherein the A:B weight ratio is from 99.5:0.5 to 95:5.

7. A heat-resistant polyester container of claim 6, wherein the A:B ratio is from 99.5:0.5 to 97:3.

8. A heat-resistant polyester container of claim 6, wherein the A:B ratio is 99.5:0.5 to 99:1.

9. A heat-pressure-resistant polyester container of claim 2, wherein the A:B weight ratio is from 99.5:0.5 to 95:5.

10. A heat-pressure-resistant polyester container of claim 9, wherein the A:B ratio is from 99.5:0.5 to 97:3.

11. A heat-pressure-resistant polyester container of claim 9, wherein the A:B ratio is 99.5:0.5 to 99:1.

* * * * *